(12) United States Patent
Sharma et al.

(10) Patent No.: US 12,443,560 B2
(45) Date of Patent: *Oct. 14, 2025

(54) MIRRORING OBJECTS BETWEEN DIFFERENT CLOUD PROVIDERS

(71) Applicant: NetApp Inc., San Jose, CA (US)

(72) Inventors: Palak Sharma, Haryana (IN); Cheryl Marie Thompson, Sunnyvale, CA (US); Qinghua Zheng, San Jose, CA (US); Venkateswarlu Tella, Bangalore (IN)

(73) Assignee: NetApp, Inc., San Jose, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 18/308,313

(22) Filed: Apr. 27, 2023

(65) Prior Publication Data

US 2024/0362183 A1  Oct. 31, 2024

(51) Int. Cl.
*G06F 16/11* (2019.01)
*G06F 16/174* (2019.01)

(52) U.S. Cl.
CPC ........ *G06F 16/125* (2019.01); *G06F 16/1744* (2019.01)

(58) Field of Classification Search
CPC .......................... G06F 16/125; G06F 16/1744
See application file for complete search history.

(56) References Cited

U.S. PATENT DOCUMENTS

| | | |
|---|---|---|
| 10,129,100 B2 | 11/2018 | Hinrichs et al. |
| 10,503,697 B1 | 12/2019 | Singh et al. |
| 10,521,399 B1 | 12/2019 | Ben-Tsion |
| 10,852,976 B2 | 12/2020 | George et al. |
| 10,911,540 B1 | 2/2021 | Gunasekaran et al. |
| 10,958,732 B1 * | 3/2021 | Procopio ................. H04L 67/10 |
| 11,016,943 B2 | 5/2021 | George et al. |
| 11,086,545 B1 | 8/2021 | Dayal et al. |
| 11,093,139 B1 | 8/2021 | Karr et al. |
| 11,144,498 B2 | 10/2021 | George et al. |

(Continued)

OTHER PUBLICATIONS

Non Final Office Action mailed Jun. 10, 2024 for U.S. Appl. No. 18/308,337, filed Apr. 27, 2023, 30 pages.

(Continued)

*Primary Examiner* — Debbie M Le
*Assistant Examiner* — Huen Wong
(74) *Attorney, Agent, or Firm* — Cooper Legal Group, LLC

(57) ABSTRACT

Techniques are provided for mirroring objects between object stores hosted by cloud providers that could have different data layout requirements. An object may be stored within an object store that supports a unified object format where the object is capable of storing compressed data. The object may be mirrored to a destination object store that may also support the unified object format or to a destination object store that does not support the unified object format. If the destination object store does not support the unified object format, then slot header metadata within the object is used to decompress the data within the object into an uncompressed format. The data is packaged from being in the uncompressed format into a fixed offset format supported by the destination object store to create a mirrored object that is stored into the destination object store while retaining compression of the data.

20 Claims, 10 Drawing Sheets

(56) References Cited

U.S. PATENT DOCUMENTS

| | | |
|---|---|---|
| 11,188,500 B2 | 11/2021 | Kushwah et al. |
| 2010/0325094 A1* | 12/2010 | Yang ................. G06F 16/22 |
| | | 707/693 |
| 2010/0332818 A1* | 12/2010 | Prahlad ............. G06Q 50/188 |
| | | 709/215 |
| 2012/0089579 A1* | 4/2012 | Ranade ............. G06F 16/183 |
| | | 707/693 |
| 2013/0073519 A1 | 3/2013 | Lewis et al. |
| 2013/0110778 A1* | 5/2013 | Taylor ............. G06F 11/1435 |
| | | 707/624 |
| 2013/0145362 A1 | 6/2013 | Dawson et al. |
| 2014/0237201 A1 | 8/2014 | Swift |
| 2015/0293954 A1* | 10/2015 | Hsiao ............... G06F 16/22 |
| | | 715/738 |
| 2017/0199675 A1* | 7/2017 | Subramanian ........ G06F 3/0608 |
| 2017/0199707 A1* | 7/2017 | Varghese ............ G06F 3/0608 |
| 2017/0293717 A1* | 10/2017 | Yu .................. H04L 67/1095 |
| 2018/0217910 A1* | 8/2018 | Yang ................. G06F 11/3006 |
| 2019/0243688 A1* | 8/2019 | Karmarkar ........... G06F 9/5083 |
| 2020/0125452 A1* | 4/2020 | Kommera ............ G06F 11/1464 |
| 2020/0285611 A1 | 9/2020 | George et al. |
| 2020/0285612 A1* | 9/2020 | George ............. G06F 16/907 |
| 2020/0285613 A1 | 9/2020 | George et al. |
| 2020/0285614 A1 | 9/2020 | George et al. |
| 2021/0405882 A1* | 12/2021 | Venkatasubbaiah ........ |
| | | G06F 3/0641 |
| 2022/0138207 A1* | 5/2022 | Yelheri ............. G06F 11/2094 |
| | | 707/722 |
| 2022/0374395 A1* | 11/2022 | Scrivano ........... G06F 16/1744 |
| 2023/0133433 A1* | 5/2023 | Sharma ............. G06F 16/116 |
| 2023/0135151 A1* | 5/2023 | Sharma ............. G06F 16/116 |
| 2023/0135954 A1* | 5/2023 | Sharma ............. G06F 11/1453 |

OTHER PUBLICATIONS

Final Office Action mailed Oct. 18, 2024 for U.S. Appl. No. 18/308,337, filed Apr. 27, 2023, 35 pages.

Notice of Allowance mailed on May 13, 2025 for U.S. Appl. No. 18/308,337, filed Apr. 27, 2023, 15 pages.

"Manage SnapMirror volume replication", NetApp, URL: https://docs.netapp.com/us-en/ontap/pdfs/sidebar/Manage_SnapMirror_volume_replication.pdf, Apr. 3, 2025, 53 pages.

* cited by examiner

US 12,443,560 B2

MIRRORING OBJECTS BETWEEN DIFFERENT CLOUD PROVIDERS

BACKGROUND

A device such as a node (which includes a computing device/system) may store data on behalf of a client system (also referred to as a "client") within a volume. The volume may be stored within local storage accessible to the device, such as within on-premise storage. The device may implement storage management functions for the client. For example, the device may create backups of the volume by creating snapshots of the volume. A snapshot of the volume may capture a point-in-time representation of a state of the volume. The device may use the snapshot to restore the volume back to a state of the volume when the snapshot was created. A cloud backup system may be configured to back up the snapshots to an object store, using storage that is typically lower cost than on-premise storage. A hybrid storage system may utilize storage of the device as a "performance tier" for actively processing client I/O (input/output) requests to read and write data and the object store as an external "capacity tier" for storing infrequently accessed data. The cloud backup system and the hybrid storage system may store objects within object stores that may be hosted by different cloud providers that may have different data layout requirements.

DETAILED DESCRIPTION

Figure 1:
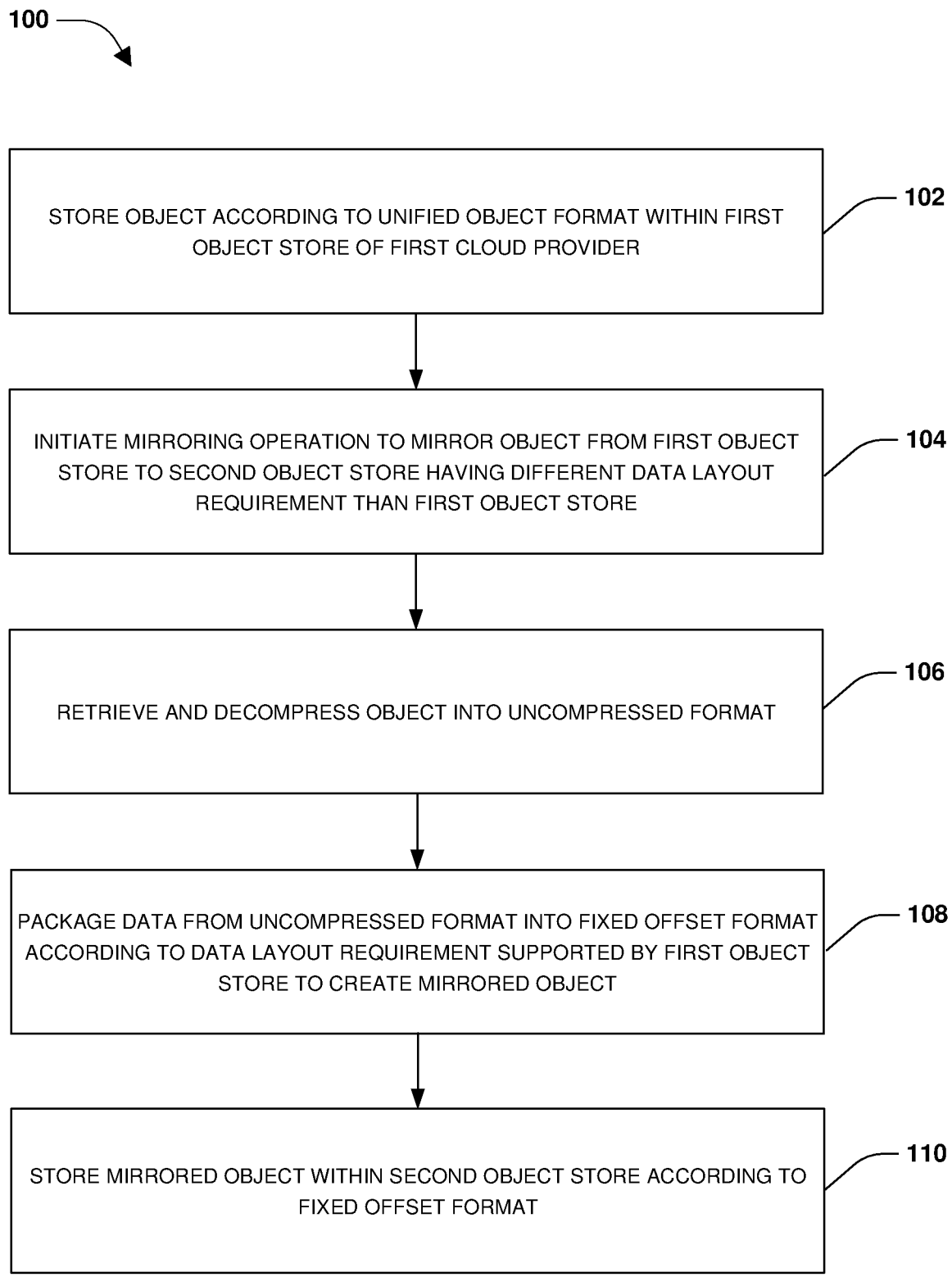
FIG. 1 is a flow chart illustrating an example of mirroring objects between different cloud providers in accordance with an embodiment of the present technology.

The innovative techniques described herein are directed to mirroring objects between different cloud providers. A storage system may store data within objects that are stored into an object store. The object store may be hosted by a cloud provider, on-premise, or elsewhere. The storage system may include a cloud backup system used to backup snapshots of volumes to the object store. The storage system may include a hybrid storage system that stores data between different storage tiers such as a local on-premise performance tier or the object store. The storage system may utilize a unified object format in order to provide a cost effective system for storing and retrieving data in the object store. Frequently accessed client data (or any other data, also referred interchangeably as "data") may be stored within a performance tier that provides low latency access to the data. In this way, I/O operations are executed upon the performance tier for reduced latency and improved performance for accessing the client data. Infrequently accessed data is tiered out from the performance tier to the object store for long term, scalable, low cost storage. To reduce the cost and storage consumed by the infrequently accessed data, the unified object format is used to preserve any compression that was performed upon the data while in the performance tier. The unified object format is also used to preserve any additional compression for the data. Such compression greatly reduces the amount of storage used to store this data within the object store, which provides substantial cost savings to a client compared to if uncompressed data was stored in the object store.

Unfortunately, different cloud providers may have different layout requirements, which affects the ability to utilize the same unified object format layout across the different cloud providers. Many cloud providers may have layout requirements that allow for the unified object format layout to be used and shared across the cloud providers so that compressed data can still be stored and identified within the objects. But for some cloud providers, data is written out in a different format such as an uncompressed format with defined offsets/boundaries (e.g., 4 kb boundaries) because better storage savings can be achieved with this fixed format where a backend of these cloud providers are implementing compression, deduplication, and/or other storage efficiency functionality provided by the backend of the cloud providers. Thus, objects stored through these cloud providers have a different format (uncompressed data stored at fixed offsets and boundaries) than the unified object format layout (compressed data stored within variable sized objects at non-fixed offsets and boundaries), which can be problematic where one of these cloud providers is used as either a primary or secondary site and another cloud provider that supports the unified object format is used as the other secondary or primary site.

Accordingly, the techniques provided herein relate to a customized cloud mirroring operation that is capable of mirroring objects between cloud providers with similar data layout requirements or between cloud providers that have different data layout requirements. The mirroring operation is implemented in an adaptive manner to perform mirroring in an optimized way that takes into account a current data layout requirement and format of how an object is currently stored, a data layout requirement and format of where the object will be mirrored, cloud provider charging models, current capacity consumption, and available compression algorithms that can be selected based upon various criteria (e.g., a heavier compression algorithm for storage cost savings vs a lighter compression algorithm for quicker decompression).

In some embodiments, the mirroring operation is implemented to dynamically mirror objects from an object store of a first cloud provider to an object store of a second cloud provider. The first cloud provider has a first data layout requirement that supports the unified object format where compressed data can be stored in variable sized objects. The second cloud provider has a second data layout requirement that does not support the unified object format, but instead supports a fixed offset format where uncompressed data is stored at fixed offsets and boundaries.

The mirroring operation retrieves an object from the first object store in the unified object format where compressed data is stored in non-fixed offsets and boundaries within the arbitrarily sized object. To obtain the data in a raw uncompressed format, the mirroring operation utilizes slot header metadata within the object to decompress the data from slots within the object. The slot header metadata includes a first metadata portion comprising compression group numbers of slots within which blocks of the compressed data is stored and compression group logical indexes in the compression group numbers at which the slots are located. The slot header metadata includes a second metadata portion comprising offset and length location information for the compressed data within the first data section. The mirroring operation packages the data from being in the raw uncompressed format into the fixed offset format where the data is stored in an uncompressed format at fixed offsets and boundaries within slots of a data portion of a mirrored object. In this way, the mirrored object is stored into the second object store according to the fixed offset format satisfying the second data layout requirement of the second cloud provider.

In some embodiments, the mirroring operation is implemented to dynamically mirror objects from a first cloud provider to a second cloud provider that both support the unified object format. The mirroring operation retrieves the object in a raw format from the first object store of the first cloud provider. The mirroring operation creates, using the data of the object in the raw format, a mirrored object retaining the unified object format. The data is populated into a plurality of slots of a data section of the mirrored object while retaining the compressed format. The slot header metadata of the object is attached to the mirrored object. In this way, the mirrored object is stored within the second object store according to the unified object format.

Various embodiments of the present technology provide for a wide range of technical effects, advantages, and/or improvements to computing systems and components. For example, various embodiments may include one or more of the following technical effects, advantages, and/or improvements: 1) the ability for both a cloud backup system and a hybrid storage system to interpret a unified object format so that both systems may manage and provide functionality for objects formatted according to the unified object format; 2) the ability to retain compression of data performed by a file system at a performance tier when the data is tiered to an object store in order to reduce storage consumption and cost of storing data in the object store; 3) the ability to provide additional compression for data being tiered to an object store in order to reduce storage consumption and cost of storing data in the object store; and 4) the ability to migrate objects amongst object stores that may support different object format layout requirements, thus allowing clients to migrate data between object stores of different cloud providers in order to achieve certain objectives (e.g., move data to a more performant cloud provider, move data to a lower cost cloud provider, move data to a cloud provider supporting a particular data format or having a particular data layout requirement, etc.).

Figure 3A:
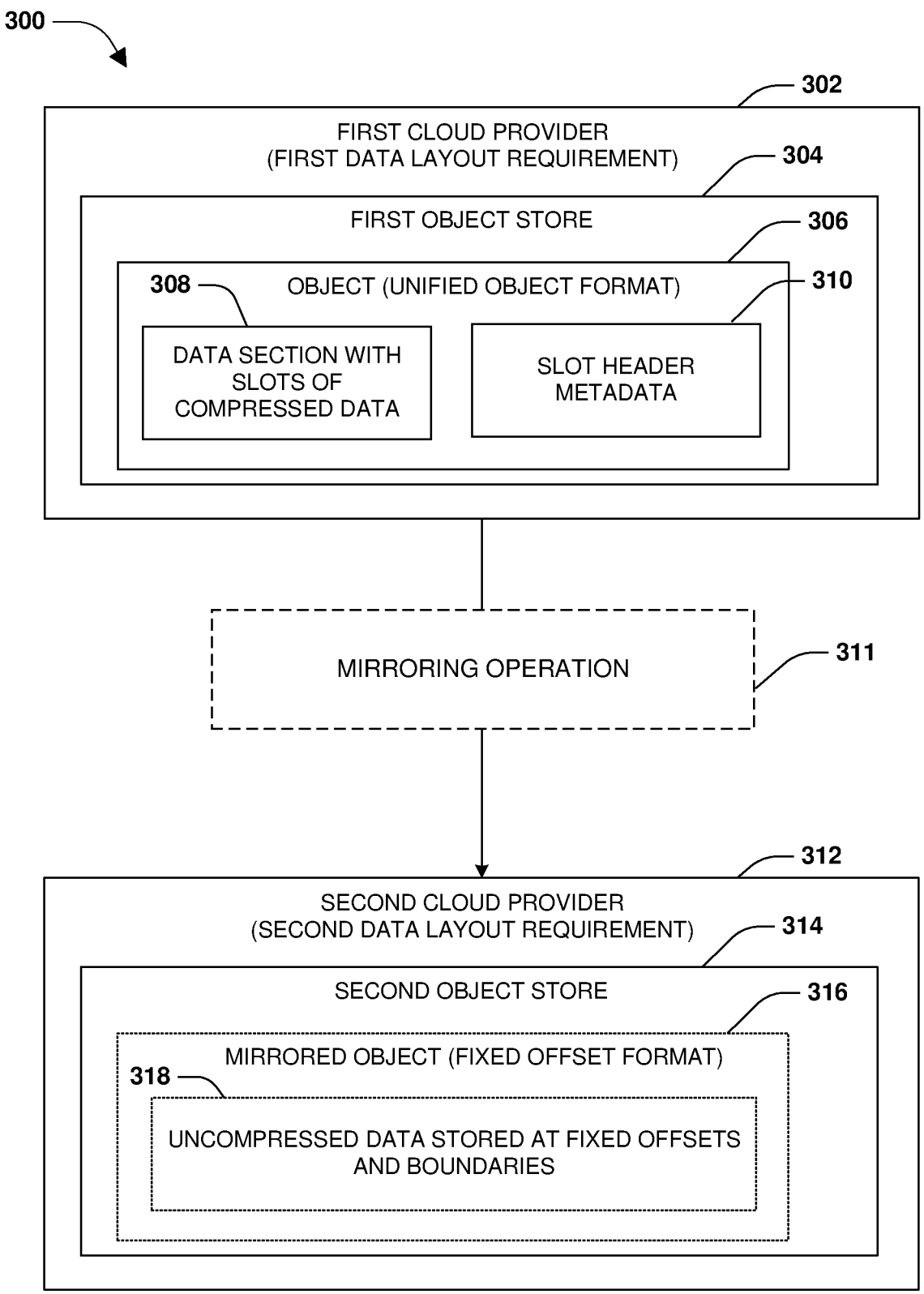
FIG. 3A is a component block diagram illustrating an example system for mirroring objects between different cloud providers in accordance with an embodiment of the present technology.

FIG. 1 is a flow chart illustrating an example of a method 100 for mirroring objects between different cloud providers, which is described in conjunction with a system 300 of FIG. 3A. A storage system, such as a hybrid storage system, may create an object 306 for storing data (e.g., data of a volume, a snapshot, etc.). The object 306 may be formatted according to a unified object format. The object 306 may comprise a data portion 308 with slots into which the data can be stored. The data may be compressed data that is stored into the slots, such as where the storage system performs compression upon the data while the data is stored within a performance tier before being tiered out to a first object store 304 hosted by a first cloud provider 302. In some embodiments, additional compression may be performed upon the compressed data to create additionally compressed data that is stored into the slots of the data portion 308 of the object 306.

To preserve the compression and/or additional compression performed upon the data stored within the slot of the data portion 308 of the object 306, slot header metadata 310 is populated with compression group information so that the data within the object 306 can retain the compression and/or additional compression performed upon the data. The compression group information is used to locate the data (compressed data) within the slots of the data portion 308 of the object 306. The slot header metadata 310 includes a first metadata portion that is populated with compression group numbers of the slots within which blocks of the data are stored in the data portion 308 of the object 306. The first metadata portion comprises compression group logical indexes in the compression group numbers at which the slots are located. The slot header metadata 310 includes a second metadata portion that is populated with offset and length location information for the data within the data portion 308 of the object 306. It may be appreciated that further embodiments and details of the unified object format will be subsequently described in relation to FIGS. 4-6.

The object 306 may be formatted according to the unified object format that satisfies a first data layout requirement of the first cloud provider 302 hosting the first object store 304 into which the object 306 will be stored. The first data layout requirement may allow for compressed data to be packaged into variable sized objects. The first data layout requirement may specify that for each slot of the object 306, compression group information is stored according to a tuple. The tuple includes a compression group number of a compression group of a slot, a compression group read offset as a read offset of the compression group, and a compression group read length as a length of the compression group that can be read. For example, the tuple comprise compression group information in an optimized form: {cg_num, cg_read_offset, cg_read_length} for all 1024 slots of the object 306 (or any other number of slots within the object), where cg_num is compression group number, cg_read_offset is the read offset of the compression group, and cg_read_length is the length of the compression group to read. In this way, the object 306 is formatted according to the unified object format that satisfies the first data layout requirement of the first cloud provider 302 hosting the first object store 304. The object 306 comprises the data stored within the slots of the data portion 308 of the object 306 in a compressed format according to non-fixed offsets and boundaries and comprises the slot header metadata 310 attached to the object 306. The object 306 is stored into the first object store 304, during operation 102 of method 100.

During operation 104 of method 100, a mirroring operation 311 may be implemented to mirror the object 306 from the first object store 304 to a second object store 314 hosted by a second cloud provider 312. The mirroring operation 311 may be triggered based upon various triggers, such as a user requesting migration of user data from the first cloud provider 302 to the second cloud provider 312, a determination that the first cloud provider 302 is not satisfying a service level agreement (SLA) guaranteed to the user (e.g., slower performance and data access than requested) but that the second cloud provider 312 can satisfy, a determination that that second cloud provider 312 provides lower cost storage than the first cloud provider 302 (e.g., evaluation of cloud provider charging models), a storage consumption reaching a threshold amount (e.g., evaluation of current capacity consumption), a threshold amount of a storage budget being used up, or for any other reason.

The second cloud provider 312 may support a second data layout requirement different than the first data layout requirement of the first cloud provider 302. The second cloud provider 312 may not support the unified object format with which the object 306 is formatted. The second cloud provider 312 may not support the non-fixed offsets and boundaries of the unified object format. The second cloud provider 312 may not support variable sized objects. The second cloud provider 312 may not support the storage of compressed data within objects. Instead, the second data layout requirement of the second cloud provider 312 may require storage of data at fixed/defined offsets and boundaries, and thus the data cannot be compressed. The mirroring operation 311 detects that the object 306 is formatted according to the unified object format and that the second cloud provider 312 and the second object store 314 do not support the unified object format. The mirroring operation 311 detects that the object 306 is formatted according to the unified object format based upon a determination that a header of the object 306 comprises metadata of the unified object format (e.g., compression information). The mirroring operation 311 may be configured with a list of cloud providers that support the unified object format and/or a list of cloud providers that do not currently support the unified object format.

As part of mirroring the object 306 into the second object store 314 of the second cloud provider 312, the mirroring operation 311 retrieves the object 306, stored in the unified object format according to the first data layout requirement, from the first object store 304 of the first cloud provider 302, during operation 106 of method 100. The mirroring operation 311, on the fly during the mirroring of the object 306, utilizes the slot header metadata 310 to locate and decompress the data from the slots within the data portion 308 to obtain the data in an uncompressed format (a raw uncompressed format). The compression group numbers, compression group logical indexes, and the offset and length location information within the first and second metadata portions of the slot header metadata 310 are used to locate and decompress the data.

During operation 108 of method 100, the mirroring operation 311 packages the data from being in the uncompressed format into a fixed offset format according to the second data layout requirement of the second cloud provider 312 to create a mirrored object 316 where the data is stored (uncompressed) at fixed offsets and boundaries (e.g., 4 kb offsets) within a plurality of slots of a data portion 318 of the mirrored object 316. During operation 110 of method 100, the mirroring operation 311 stores the mirrored object 316 into the second object store 314 of the second cloud provider 312 according to the fixed offset format satisfying the second data layout requirement of the second cloud provider 312.

Figure 2:
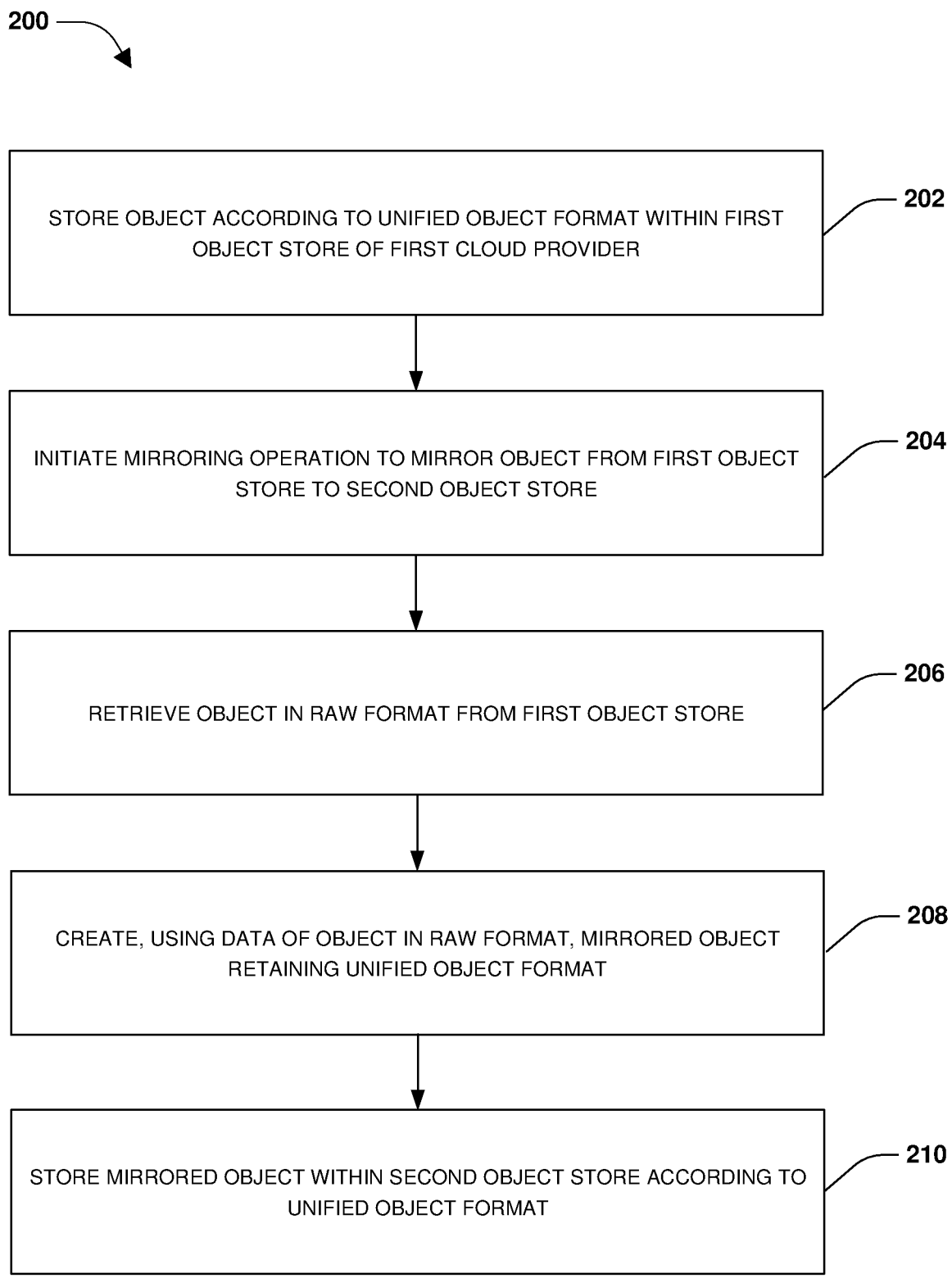
FIG. 2 is a flow chart illustrating an example of mirroring objects between different cloud providers in accordance with an embodiment of the present technology.
Figure 3B:
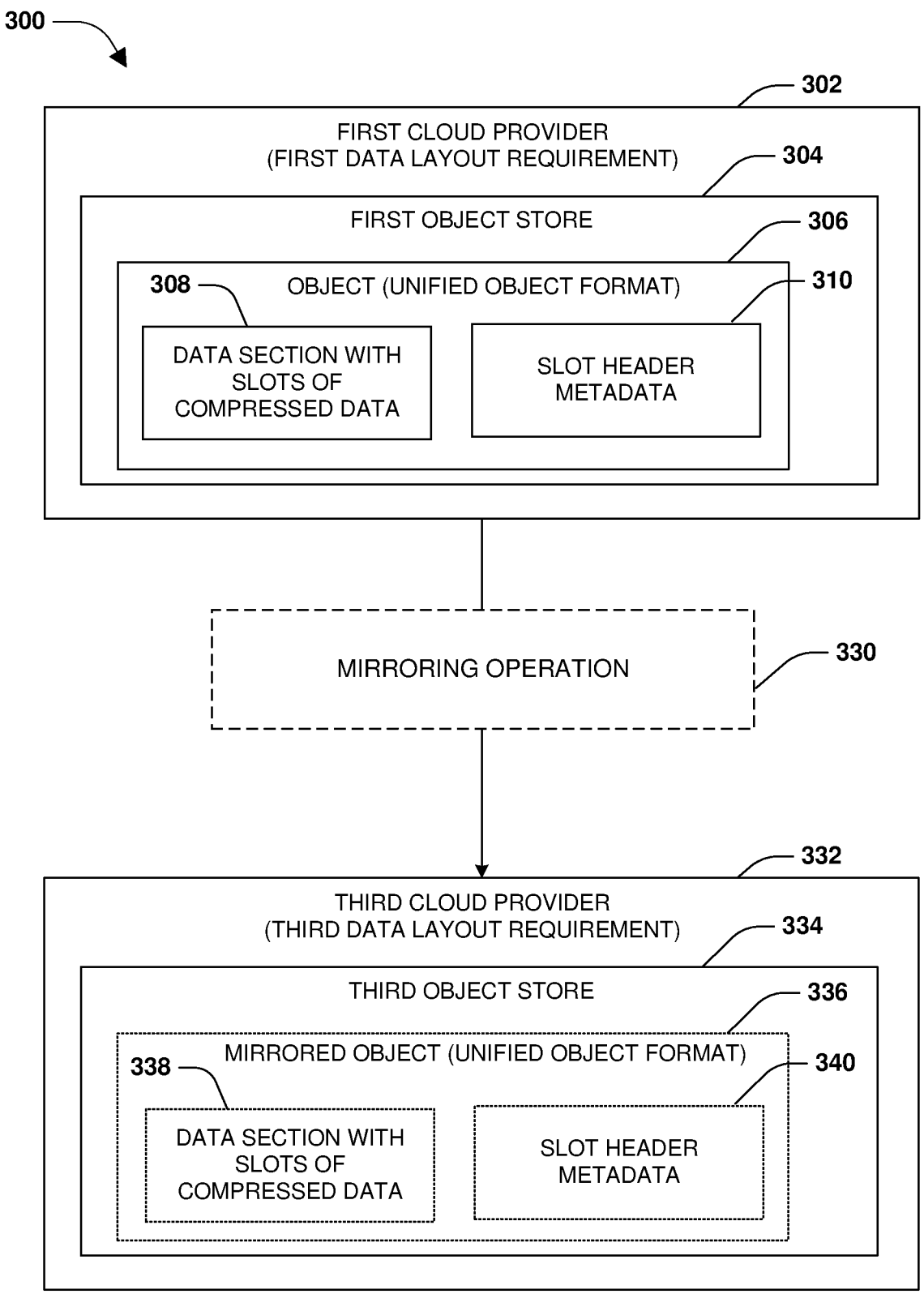
FIG. 3B is a component block diagram illustrating an example system for mirroring objects between different cloud providers in accordance with an embodiment of the present technology.

FIG. 2 is a flow chart illustrating an example of a method 200 for mirroring objects between different cloud providers, which is described in conjunction with system 300 of FIG. 3B. A storage system may create the object 306 formatted according to the unified object format. The object 306 may comprise the data portion 308 with slots into which the data can be stored. The data may be compressed data that is stored into the slots, such as where the storage system performs compression upon the data while the data is stored within a performance tier before being tiered out to the first object store 304 hosted by the first cloud provider 302. In some embodiments, additional compression may be performed upon the compressed data to create additionally compressed data that is stored into the slots of the data portion 308 of the object 306. The slot header metadata 310 is populated with compression group information so that the data within the object 306 retains the compression and/or additional compression performed upon the data. The slot header metadata 310 includes the first metadata portion that is populated with compression group numbers of the slots within which blocks of the data are stored in the data portion 308 of the object 306. The first metadata portion comprises compression group logical indexes in the compression group numbers at which the slots are located. The slot header metadata 310 includes the second metadata portion that is populated with offset and length location information for the data within the data portion 308 of the object 306.

The object 306 may be formatted according to the unified object format that satisfies the first data layout requirement of the first cloud provider 302 hosting the first object store 304 into which the object 306 will be stored. The first data layout requirement may allow for compressed data to be packaged into variable sized objects. The first data layout requirement may specify that for each slot of the object 306, compression group information is stored according to a tuple. The tuple includes a compression group number of a compression group of a slot, a compression group read offset as a read offset of the compression group, and a compression group read length as a length of the compression group that can be read. In this way, the object 306 is formatted according to the unified object format that satisfies the first data layout requirement of the first cloud provider 302 hosting the first object store 304. The object 306 comprises the data stored within the slots of the data portion 308 of the object 306 in a compressed format according to non-fixed offsets and boundaries and comprises the slot header metadata 310 attached to the object 306. The object 306 is stored into the first object store 304, during operation 202 of method 200.

During operation 204 of method 200, a mirroring operation 330 may be implemented to mirror the object 306 from the first object store 304 to a third object store 334 hosted by a third cloud provider 332. The mirroring operation 330 may be triggered based upon various triggers, such as a user requesting migration of user data from the first cloud provider 302 to the third cloud provider 332, a determination that the first cloud provider 302 is not satisfying a service level agreement (SLA) guaranteed for user (e.g., slower performance and data access than guaranteed) that the third cloud provider 332 can satisfy, a determination that that the third cloud provider 332 provides lower cost storage than the first cloud provider 302, a storage consumption reaching a threshold amount, a threshold amount of a storage budget being used up, or for any other reason.

The mirroring operation 330 may determine that the object 306 is formatted according to the unified object format comprising compressed data and satisfying the first data layout requirement of the first cloud provider 302. The mirroring operation 330 may determine that the third cloud provider 332 supports a third data layout requirement that can be satisfied by the unified object format The mirroring operation 330 may be configured with a list of cloud providers that do and/or do not support the unified object format. That is, the third data layout requirement may allow for compressed data to be stored in slots of variable sized objects according to non-fixed offsets and boundaries.

In response to the mirroring operation 330 determining that the third data layout requirement of the third cloud provider 332 supports the unified object format of the object 306, the mirroring operation 330 retrieves the object 306 in a raw format from the first object store 304 of the first cloud provider 302, during operation 206 of method 200. In some embodiments, the raw format corresponds to retrieving the compressed data from the slots of the data portion 308 of the object 306 while still in the compressed format, along with retrieving the slot header metadata 310 from the object 306. The compression information within the slot header metadata 310 may be used to locate and retrieve the compressed data from the slots.

During operation 208 of method 200, the mirroring operation 330 utilizes the data of the object 306 in the raw format (e.g., the compressed data of the data portion 308 and the slot header metadata 310) to create a mirrored object 336 that retains the unified object format of the object 306. The data (compressed data) is populated with slots of a data portion 338 of the mirrored object 336 while retaining the compressed format. The compression information within the slot header metadata 310 is used to determine which slots/locations should be populated with certain portions of the compressed data. The slot header metadata 310 of the object 306 is attached to the mirrored object 336 as slot header metadata 340. During operation 210 of method 200, the mirroring operation 330 stores the mirrored object 336 within the third object store 334 of the third cloud provider 332 according to the unified object format satisfying the third data layout requirement of the third cloud provider 332.

In some embodiment, a storage environment may be implemented as a hybrid cloud environment that is capable of formatting objects according to the unified object format and/or capable of implementing the mirroring operation. With the hybrid cloud environment, data may be stored across various types of storage hosted by various storage providers, computing devices, services, and/or nodes. For example, the hybrid cloud environment may include on-premise storage that is implemented as a performance tier of the hybrid cloud environment. The on-premise storage may be comprised of primary storage managed by a node, such as storage devices attached to the node, network attached storage, locally attached storage, memory of the node, etc. The hybrid cloud environment may also comprise storage hosted by a $3^{rd}$ party cloud storage provider (e.g., storage provided by cloud storage nodes). The storage of the $3^{rd}$ party cloud storage provider (e.g., AWS (Amazon Web Services) provided by Amazon Inc., Azure provided by Microsoft Corporation (without derogation of any third party trademark rights), a $3^{rd}$ party hyperscaler, a multi-tenant computing environment, etc.) may be implemented as an object store within which clients may store data in objects. It may be appreciated that a variety of other types of storage (e.g., hard disk drives (HDDs), solid state drives (SSD), NVMe (no-volatile memory express) storage, etc.) and/or storage provided by other services, nodes, and/or computing devices (e.g., a locally implemented object store implemented on-premise by a node) may be used as storage of the hybrid cloud environment.

The cloud backup system may create snapshots of volumes (e.g., volumes of data stored within the on-premise storage) and backup up the snapshots into the hybrid cloud environment, such as into the object store as objects. The cloud backup system can format objects, comprising snapshot data, according to the unified object format and/or is capable of implementing the mirroring operation. The hybrid storage system may store client data within the various types of storage of the hybrid cloud environment, such as by storing frequently accessed data within the on-premise storage (e.g., storing frequently accessed data within the faster on-premise storage for fast client access) and infrequency accessed data in the storage of the $3^{rd}$ party cloud storage provider such as in the object store (e.g., store infrequently accessed data within the slower object store for reduced storage costs). The hybrid storage system may tier that data between the various types of storage of the hybrid storage system.

Within conventional storage environments that do not have a unified object format, a node may store data in a volume that is hosted within storage such as on-premise storage. The cloud backup system may be capable of creating snapshots of the volume and backing up these snapshots into objects within an object store (e.g., a cloud storage environment). A snapshot, whose data is backed up into the objects, may be used to restore the volume to a prior state captured by the snapshot. These objects may be formatted according to an object format that may be proprietary to the cloud backup system. Thus, other systems such as a hybrid storage system may be unable to interpret this object format and thus is unable to provide functionality for the objects. Similarly, the hybrid storage system may provide data tiering functionality that stores frequently accessed data within a performance tier (e.g., the on-premise storage) and infrequently accessed data within a capacity tier of the object store according to a format that is proprietary to the hybrid storage system. Thus, other systems such as the cloud backup system are unable to provide functionality for the data managed by the hybrid storage system.

In addition to the hybrid storage system and the cloud backup system being unable to interpret, access, and/or provide functionality for the same objects due to using different object formats, compression may not be retained when the hybrid storage system tiers data from the performance tier to the capacity tier. In particular, the hybrid storage system may implement a temperature sensitive storage efficiency feature that may compress data in the performance tier according to various compression algorithms as the data becomes colder. In particular, as data is accessed less frequently (becomes colder), larger/heavier compression algorithms may be used to compress the cold data such as by using 32 kb compression. This compressed data may reside in the performance tier, such as an on-premise tier, and results in storage savings.

Object store storage may be relatively cheaper than storage of the performance tier, and thus the data may be tiered to the object store in order to reduce cost. Unfortunately, the compression that was performed upon the data while in the performance tier may not be maintained when tiering the data to the object store, and thus any storage savings from compression at the performance tier is lost when the data is tiered to the object store. This is because the current object format of objects used by the hybrid storage system to tier data to the object store may need the data to be stored at fixed offsets within the object, otherwise the data cannot be located. When data is compressed into a compression group, there is no longer a fixed offset for the data because the data is being compressed with other data (e.g., eight 4 kb blocks may be compressed together using 32 kb compression). Thus, when tiering the data to the object store, the data must be decompressed, packed into objects according to the object format propriety at the hybrid storage system, and stored to the object store in an uncompressed state. Thus, all storage savings from compression are lost when the data is tiered to the object store.

In order to address these deficiencies, the unified object format is compatible with both the cloud backup system and the hybrid storage system. This unified object format is used to format objects comprising data tiered out to the object store. With this unified object format, an object comprises slot header information that may be self-contained within the object. The slot header information comprises information per slot within the object and has compression group information about how data is grouped within the object. This information may be used to locate particular blocks of data within objects even if the data has been compressed through compression groups. This information may also be used to selectively retrieve or tier out certain data on-demand from the performance tier to the capacity tier. This allows the hybrid storage system to retrieve select data (e.g., frequently accessed) on-demand from the object store, and allows the cloud backup system to merely tier out remaining data not yet tiered out to the object store by the hybrid storage system.

Because the unified object format may be compatible with both the cloud backup system and the hybrid storage system, a whole volume copy to cloud backup to an object store may be provided by the cloud backup system for a volume (e.g., a volume comprising user data) managed by the hybrid storage system. The whole volume copy to cloud backup may be performed selectively by tiering blocks of the volume that have not already been tiered by the hybrid storage system to the object store. For example, if the hybrid storage system has tiered 80% of the data in the volume (e.g., relatively infrequently accessed user data) to the object store, then the cloud backup system has to merely transfer the remaining 20% of data in the volume (e.g., mainly metadata) in order to perform and complete the whole volume copy to cloud backup of the volume. That is, when data of a volume is partially tiered to the object store by the hybrid storage system, a backup to the object store of the complete volume by the cloud backup system may be incrementally performed (e.g., backing up merely the 20%) as merely the remaining data of the volume needs to be backed up to the object store and the data already stored in the object store in objects can be skipped. This is enabled because of the common unified object format that both systems can interpret and utilize.

The unified object format layout may be used to format objects comprising data being tiered to the object store, such as compressed data. The unified object format layout may be leveraged by both the hybrid storage system and the cloud backup system, along with other products and features, to format objects according to the same unified object format. This enables interplay between the hybrid storage system and the cloud backup system. For example, the hybrid storage system may tier infrequently accessed data to the object store in objects formatted according to the unified object format, while leaving some frequently accessed data and metadata in the performance tier. Subsequently, if all the data is to be archived to the object store, then the cloud backup system merely copies the remaining data from the performance tier to the object store into objects formatted according to the unified object format. Without this unified object format layout, all the data would have to be retrieved from the object store by the cloud backup system, reformatted into the object format proprietary to the cloud backup system, and then stored back into the object store. In another example, the cloud backup system may be used to archive a volume to the object store so that all data of the volume is located in the object store in objects formatted according to the unified object format. Subsequently, the hybrid storage system may be used to selectively bring back certain data (e.g., frequently accessed data and metadata) from the object store to the performance tier on-demand so that the data may be readily accessible to clients.

Because the unified object format layout enables the ability to locate particular blocks of data that have been compressed into compression groups and stored within objects, compression provided by the performance tier may be retained, along with the ability to perform additional compression.

This unified object format layout provides the ability to maintain a file system independent/agnostic format so that data managed by the file system may be interpreted by tools/analytics that run on in the object store. The unified object format layout provides seamless data mobility across different engines/modules, such as a logical replication engine, analytical tools, backup functionality, etc. The unified object format layout may be a self-contained format, which is used to preserve compression savings from the file system at the performance tier and provides flexibility to perform additional compression when tiering data out to the object store. Performing compression while tiering data to the object store improves storage savings at the capacity tier of the object store. This compression during tiering can be performed regarding of whether the data was compressed or not compressed by the file system at the performance tier. This self-contained unified object format enables the ability to decompress and recompress to a bigger compression chunk size such as by using a different (heavier) compression algorithm. The unified object format layout may be optimized to have a smaller metadata footprint for representing compression information. With this unified object format layout, slot header information is self-contained within an object. The slot header information comprises information per slot and has compression group information about how data is grouped in the group. This information is used to locate a compression group comprising a particular block of data. In this way, the slot header information can be used to translate from a slot number to an actual location in an object of a corresponding compression group containing a particular block. Accordingly, the compression group (e.g., a 32 kb compression group) can be read from the object, decompressed, and the block can be accessed.

In some embodiments, the unified object format reduces the amount of metadata that must be cached within the performance tier to a lower limit, e.g., 4 kb (e.g., an 8× reduction) for data tiered to the object store and improves the read performance on a primary workload. In particular, the proprietary object format used by the cloud backup system may be suitable for backup environments for backing up data to a capacity tier but may not be suitable for use by a file system for primary workloads (e.g., processing read and write operations such as client I/O). The proprietary object format also has metadata information used to track compression group information, but the amount of metadata is around 32 kb for a 4 mb object. This metadata may be around 0.8% of the logical data, which is substantial when a large number of objects are stored in the object store. When the proprietary object format is used in a file system, the metadata for every object needs to be cached/stored in the performance tier. This is to avoid double object store reads. Instead of having to perform two reads to the object store (e.g., a read to access the metadata from the object and a read to access the actual data according to the metadata), the first read goes to cached slot metadata information at the performance tier to obtain a location of data in the object in the object store. This first read is a local read within the performance tier and hence is low cost or overhead. The second read is performed to read the actual data from the object store using the location of the object, and thus there is a single read operation targeting the object store. With metadata consumption around 0.8%, there is too much overhead consumption of expensive storage within the performance tier used to cache such metadata. For example, for a 1000 TB amount of data tiered to the capacity tier of the object store, 8 TB of the performance tier may be consumed for caching metadata. Thus, the proprietary object format cannot be used for primary workloads, and this new unified object format overcomes these issues by reducing metadata used to store data in the performance tier to 4 kb (e.g., an 8× reduction) and improves the read performance on primary workloads. In some embodiments, the slot header information is cached as a 4 kb space optimized metadata entry within the persistent metafile, which consumes 0.1% storage compared to metadata information used by the proprietary object format.

In some embodiments, a workflow for independent and layered compression to the object store is provided. This workflow supports the ability to tier already compressed data in a file system to the object store in objects formatted according to the unified object format and/or may also perform additional compression while sending the compressed data to the object store. This multi-layered compression helps to reduce the storage consumption of the object store and has little to no impact for reads from the file system. The additional compression may correspond to compression independent from the compression performed by the file system, such as compression upon uncompressed blocks of the file system. This enables the ability to compress smaller compression groups into to larger compression groups and/or transform a compression group from being compressed by one compression algorithm to being compressed by a different compression algorithm. The additional compression may occur independently and metadata about the compression groups is self-contained and tracked as part of the object that is being written to the object store. In particular, the slot header information within an object comprises information per slot and has compression group information about how data is grouped. This information is used to locate a compression group comprising a particular block of data. In this way, the slot header information can be used to translate from a slot number to an actual location in an object of a corresponding compression group containing a particular block.

In some embodiments, performance may be improved by caching metadata information such as slot header information of objects in the performance tier. Reading a block of data from a compression group stored within an object in the object store using the unified object format layout may result in two read operations, which is inefficient and results in large latency when reading data from the object store and increased cost. Two read operations are performed because the slot header information is read first from an object header of an object to identify and locate a corresponding compression group comprising the block to read from the object. A second read operation is then performed to read the actual compression group from the object to access the block. Instead of performing two read operations to the object store, which increases latency, overhead and cost, a technique is provided for reading a block of data from a compression group stored within an object in the object store using the unified object format layout by performing a single read operation as opposed to two read operations. This is enabled by caching slot header information into a persistent metafile at the performance tier for local and quick access. The persistent metafile is first consulted locally at the performance tier to identify an {offset, len} used to access a slot of data in an object targeted by a read operation. The offset and length are then used to perform a single read operation to the object store in order to read the data from the slot of the object. In this way, merely a single read operation to the object store (a cloud computing environment) is performed, and thus improving read performance and reducing client latency.

The unified object format layout comes in 3 sections. The first section comprises first level metadata (slot header information) that contains compression group information and the index that point to logical block of compression group—{cg_num, cg_index} for all 1024 slots in the object. The second section contains second level metadata compression group information an optimized form—{cg_num, cg_read_offset, cg_read_length} for all different compression groups in an object. cg_num is a compression group number, cg_read_offset is a read offset of the compression group, and cg_read_length is a length of the compression group to read. The third section comprises compressed data information. Without caching the slot header information, a read to a block includes a first cloud read to get metadata that resides in the object that gives {cg_read_offset, cg_read_length}, and a second read on the object to read the actual contents of the slot using this metadata, which is expensive and impacts the latency and also adds to more object store reads.

This technique involves replicating the (optimized) metadata information (slot header information) that is self-contained within an object header of the object to the local/performance tier in the form of a persistent metafile. Before data is tiered out from the performance tier to the object store by the hybrid storage system, the slot header information is constructed at the performance tier as part of the creation of objects to store the data and the tiering of the objects. This slot header information (e.g., 4 kb slot header information) is cached as the persistent metafile at the performance tier for quick access. For each object tiered to the object store, this slot header information is populated within the persistent metafile and can be retrieved from the persistent metafile using an object identifier of an object (e.g., each entry within the persistent metafile may map an object identifier of an object to slot header information of the object). The persistent metafile is small, and thus there is little to no impact to storage capacity from keeping the persistent metafile in the performance tier.

In some embodiments, a technique is provided to track what compression mechanism was used for an object ID of an object in a persistent manner. In particular, if data has been tiered out to the object store with the object ID as part of a normal write operation, then this is tracked. Thus, a resync operation will skip that object ID so that the data is only written out once for the same path (the normal write operation). Even if there is a restart of a write operation or a resync, the path used to write the data to the object store is tracked. This ensures that when data is written to the object store, there will be no instances where two objects have the same name but different data/sizes. This enables the ability to move data between different object stores (cloud providers) that support different object layouts, while still retaining compression and/or storage savings when possible.

As an example, different object store providers (cloud providers) may have different layout requirements, which affects the ability to utilize the same unified object format layout across different object store providers. Some object store providers may have layout requirements that allow for the unified object format layout to be used and shared across the object store providers so that compressed data can still be stored and identified within objects using the previously described techniques regardless of which object store of the object store providers is used to store the objects. But for some cloud providers, data is written out in a different format such as an uncompressed format with defined offsets/boundaries (4 kb boundaries) because better storage savings can be achieved with this fixed format by using compression, deduplication, and/or other storage efficiency functionality provided by a backend of these object store providers. Thus, objects stored through these object store providers have a different format (uncompressed data stored at fixed boundaries) than the unified object format layout, which can be problematic where one of these object store providers is used as either a primary or secondary site and an object store provider that supports the unified object format is used as the other secondary or primary site.

Cloud mirroring may be performed from a first cloud provider supporting the unified object format layer (e.g., compressed data in variable sized objects) to a second cloud provider where the unified object format layer is not used (e.g., an object store where only uncompressed data is packaged into objects at defined offsets/boundaries according to a fixed format). In this scenario, the data from the first cloud provider can be retrieved, uncompressed, packaged into the fixed format, and stored into the second cloud provider. However, issues may occur when trying to mirror from the second cloud provider to the first cloud provider. Accordingly, in this reverse scenario, uncompressed data from the second cloud provider may be mirrored to the first cloud provider. When the uncompressed data is read from the second cloud provider, a compression algorithm may be implemented on the fly to compress the data. The compressed data is then stored in objects according to the unified object format layer at the first cloud provider. However, there may not be a way to remember what compression algorithm was used. There could be instances where there is a retry mechanism that retries storing an object to the first cloud provider. If a different compression algorithm is used by the retry mechanism, then there could be two objects with the same name but different data/sizes due to the different compression algorithms. This will violate the invariant that any data written to an object store provider using a same name is to be the same when written out again. If there is no way to ensure that data, written out with the same name from one write to another write, is identical, then data corruption could occur. To address this issue, this technique tracks what compression mechanism was used for an object ID of an object in a persistent manner and what path was used to write the data to the object store. If data has been tiered out to the object store with an object ID as part of a normal write operation, then this normal write path is tracked. Thus, a resync operation will skip that object ID so that the data is only written out once for the same path (the normal write path). Even if there is a restart of a write operation or a resync, the path used to write the data to the object store is tracked. This ensures that when data is written to the object store, there will be no instances where two objects have the same name but different data/sizes. This enables the ability to move data between different object stores (cloud providers) that support different object layouts, while still retaining compression and/or storage savings when possible.

Figure 4:
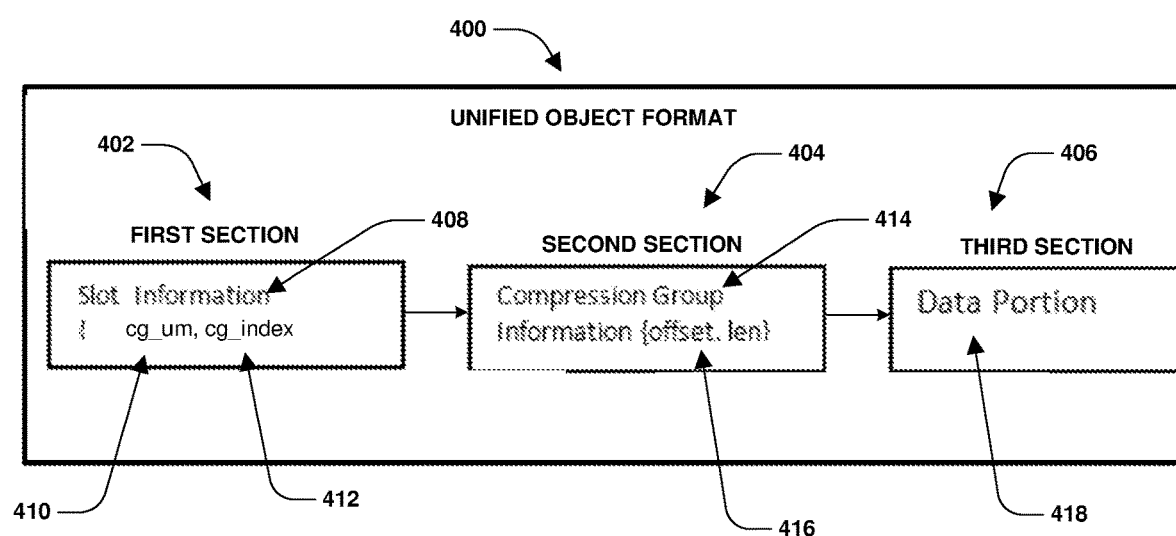
FIG. 4 is an example of a unified object format in accordance with an embodiment of the present technology.

In some embodiments of implementing a unified object format 400 illustrated by FIG. 4, the unified object format 400 at least overcomes the following disadvantage of conventional proprietary object formats used by the hybrid storage system and/or the cloud backup system. A proprietary object format used by a file system at a performance tier to tier blocks (e.g., a propriety object format of the hybrid storage system) has at least the following limitations: 1) the data that is compressed in the file system may not be preserved and requires decompression while sending the data to an object store as objects; and 2) there is no ability to improve storage consumption savings by otherwise being able to do additional compression on the data during tiering and/or recompressing already compressed blocks with a different heavier/stronger compression algorithm. These limitations of the proprietary object format used by the file system reduces the scope on the amount of capacity tier storage consumption savings in the object store. These issues occur because the block information of the data in the performance tier is stored at the fixed offsets. When the data is compressed, there is no fixed offset for the data, which would be needed for compression with other blocks. Accordingly, the compressed blocks of the file system must be uncompressed, thus losing the storage savings when being sent to capacity tier. As an example, v1, v2, v3, v4 are blocks that are not compressed by file system (e.g., virtual volume block number 1 (v1), virtual volume block number 2 (v2), etc.). These blocks are written in an uncompressed form to physical blocks P1, P2, P3 and P4 respectively (e.g., physical volume block number 1 (P1), physical volume block number 2 (P2), etc.). In an example, v5 and v6 are compressed to a P5 block, and v7 and v8 are compressed to a P7 block. v9, v10, v11, v12, v13, v14, v15, and v16 are compressed to 2 blocks P9 and P10. As the proprietary object format does not represent the compressed data, the data is sent to the object store in an uncompressed form.

In order to overcome these limitations, this unified object format 400 is introduced, an example of which is illustrated by FIG. 4. The unified object format 400 may be divided into 3 sections, such as a first section 402, a second section 404, and a third section. The first section 402 comprises a first level metadata section information. The first level metadata section information of the first section 402 (first metadata part) comprises slot information 408 that gives information about a block, such as to which compression group 'number' 410 a slot comprising the block belongs and a logical index 412 in that compression group 'number' of the block. The first level metadata section information of the first section 402 (first metadata part) may be of the format of <cg_num, cg_index>. The second section comprises a second metadata part. The second section 404 (second metadata part) may comprise all the compression group's information 414 and maintains a mapping or location (location information 416) to the data portion 418 of the object in optimized form (e.g., an offset and a length of the data portion 418). The second section 404 (second metadata part) may be in a format of <offset, len>. The third section 406 is a data section that contains the actual data portion 418, such as the actual compressed data.

The first level metadata section information of the first section 402 (first metadata part) may be part of the on-disk format layout that tracks a list of all the object blocks that belongs to the object. The first level metadata section information of the first section 402 (first metadata part)

contains the mapping of the object block number to the compression group to which the object block number belongs and a logical block number in that compression group. For example, first level metadata section information of the first section 402 (first metadata part) may comprise <cg_num=1, cg_index=1>, <cg_num=1, cg_index=2>, <cg_num=2, cg_index=1>, . . . . The second section 404 (second metadata part) may contain information 414 about the compression group, which has location information 416 such <offset, len> for the data section that needs to be read. For example, the second section 404 (second metadata part) may comprise <offset=10K, len-2K>, <offset=12, len=2K>. The independent compression group metadata information within the object layout helps to perform independent compression and is transparent to the file system of the performance tier. In this way, FIG. 4 illustrates an example of the unified object format 400 comprising the first section 402 (first metadata part), the second section 404 (second metadata part), and the third section 406 (data section).

Figure 5:
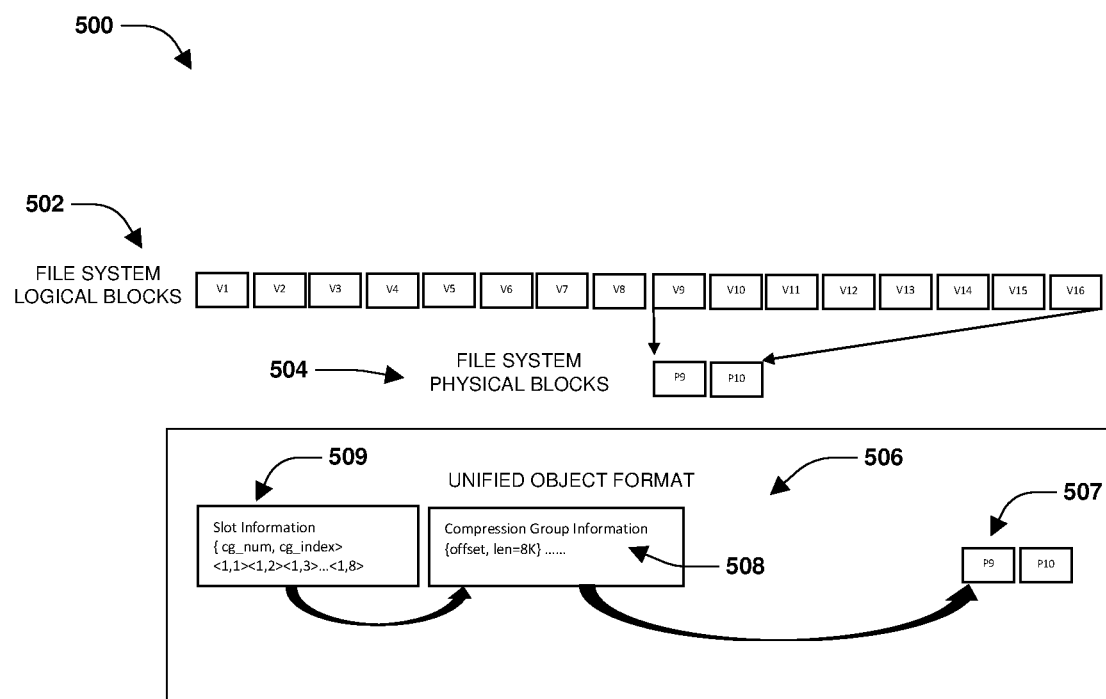
FIG. 5 is an example of a unified object format in accordance with an embodiment of the present technology.

Referring to example 500 of FIG. 5, the unified object format 506 can retain the compressed data of the file system. The file system may maintain file system logical blocks 502, such as V1-V16. Data of the file system logical blocks may be physically stored as file system physical blocks 504 on storage, such as P9 and P10. The unified object format 506 is used to copy the compressed data of the file system to the object store according to an object layout (without any decompression and recompression) and update the metadata sections of the object layout. The file system logical blocks V9 to V16 may be compressed into file system physical blocks P9 and P10. In the unified object format 506, the data from file system physical blocks P9 and P10 may be copied into an object's data section 507. A second section 508 (second metadata part) of "compression group" information is updated with <offset, len=8K>. Each object slot information 509 is updated with corresponding compression group number (cg_num) and logical index in the compression group number. Assuming cg_num is 1 and represents 32 KB's compressed data which is 8 KB, and all the file system logical blocks V9 to V16 are in that order for compression. In this example, the object slot information 509 will be <1,1>,<1,2><1,3>,<1,4>,<1,5>,<1,6><1,7>,<1,8>.

Figure 6:
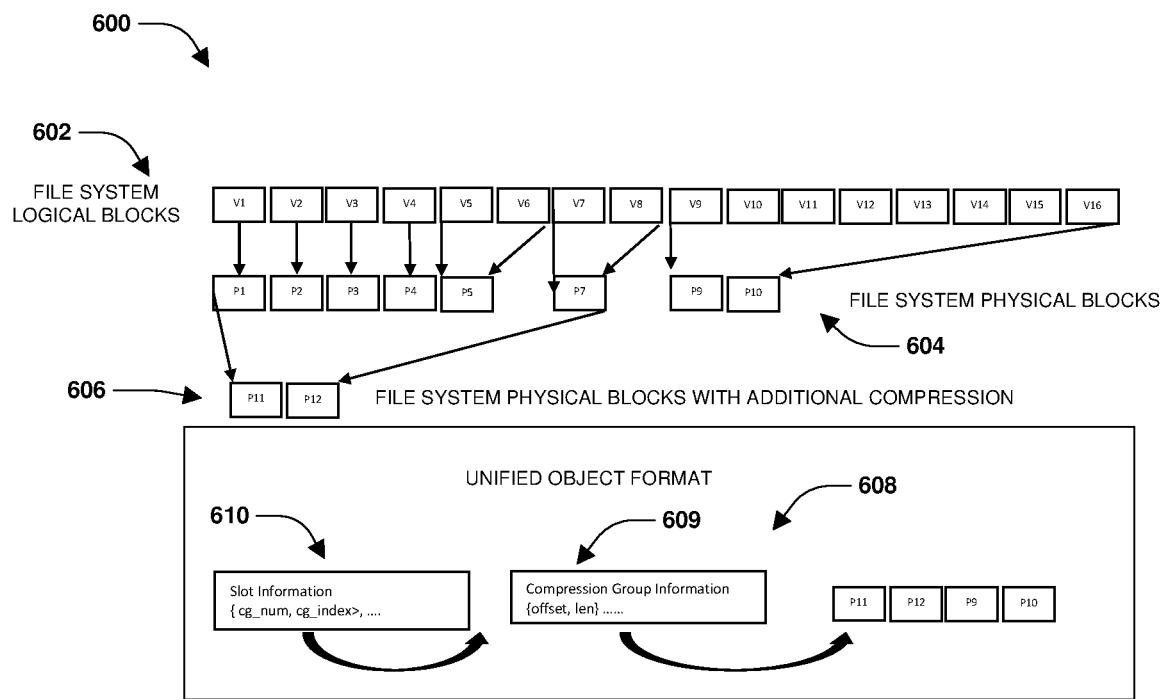
FIG. 6 is an example of a unified object format in accordance with an embodiment of the present technology.

Referring to example 600 of FIG. 6, unified object format 608 has ability to perform additional compression of the file system data, such as upon the file system logical blocks 602 and/or the file system physical blocks 604. The additional compression comes in 2 forms: 1) performing compression on blocks that are not tiered or were not compressed and 2) performing recompression of small compression groups to create bigger compression groups, which can be done with a different heavier compression algorithm. The different types of blocks of the file system include: file system logical blocks V1 to V4 that are uncompressed blocks; file system logical blocks V5 and V6 that are compressed to file system physical blocks P5, and file system logical blocks V7 and V8 that are compressed to file system physical block P7. In this way, file system logical blocks 602 are stored within file system physical blocks 604. In the unified object format 608, the data of file system physical blocks P5 and P7 is decompressed and recompressed with the data of the uncompressed blocks of file system logical blocks V1 to V4 to create file system physical blocks 606 P11 and P12 that have additional compression. A second section 609 (second metadata part) of "compression group" information is updated with <offset, len>. Each object slot information 610 is updated with corresponding compression group number (cg_num) and logical index in the compression group number. Assuming cg_num is 2 and all file system logical blocks V1 to V8 are in that order for compression, then the object slot information 610 will be <2,1>,<2,2><2,3>,<2,4>,<2,5>,<2,6><2,7>,<2,8>.

Figure 7:
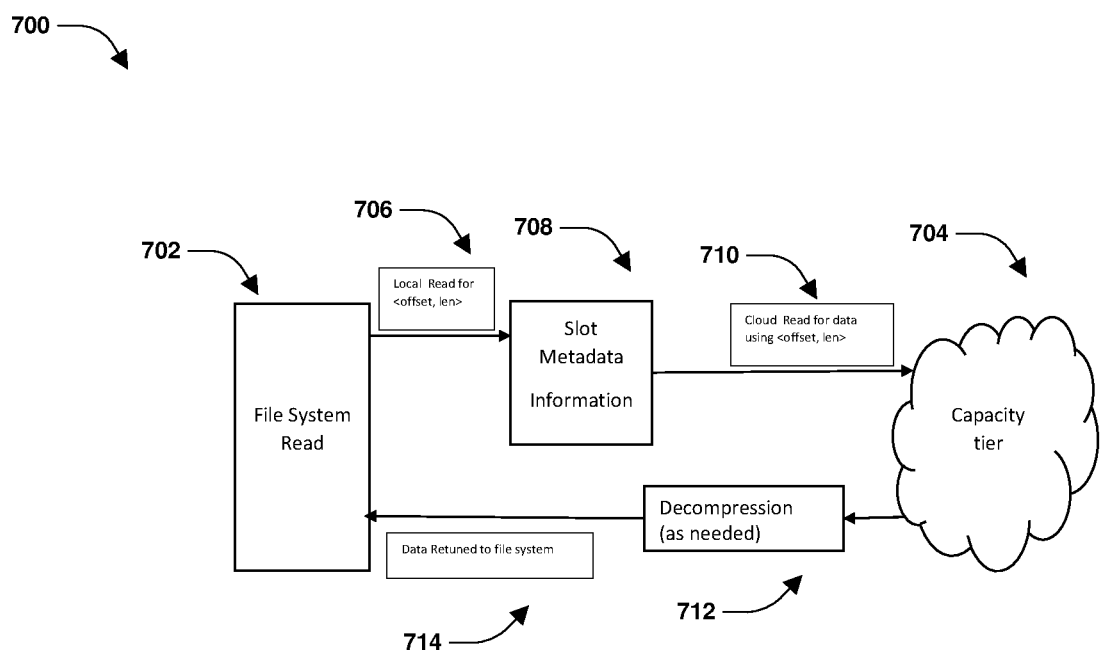
FIG. 7 is a block diagram illustrating an example of implementing a unified object format in accordance with an embodiment of the present technology.

The unified object format supports the ability to retain the compressed data of the file system (and perform additional compression) by providing the additional metadata section in the layout along with the data section. However, this forces the file system to perform two read operations to the object store (cloud) to process a single read operation for data stored within an object in the object store. In the first cloud read operation, the metadata section (slot header information) is checked to identify a location of the data within the object. In the second cloud read operation, the actual data is read based on the location information obtained by the first cloud read operation. The double cloud read operations result in performance issues and impacts the latency of the read operation. To address this and improve performance, the metadata information may be stored locally in the performance tier. So, during a read operation, the file system first consults the slot object metadata information stored locally at the performance tier to find the object location information. Once the object location information is obtained, a single cloud read is performed to get the actual data. During the single cloud read to get the actual data, the data may be decompressed if the data is part of a compression group. FIG. 7 illustrates a read workflow 700 for a file system read 702 to a capacity tier 704 of the object store. A local read 706 for an offset and length is performed to slot metadata information 708 that may be cached within the performance tier. Next, a cloud read 710 is performed using the offset and length to the capacity tier 704 to read data within an object in the capacity tier 704. If the data is to be decompressed, then decompression 712 is performed and the data is returned 714 for the file system read 702.

Figure 8:
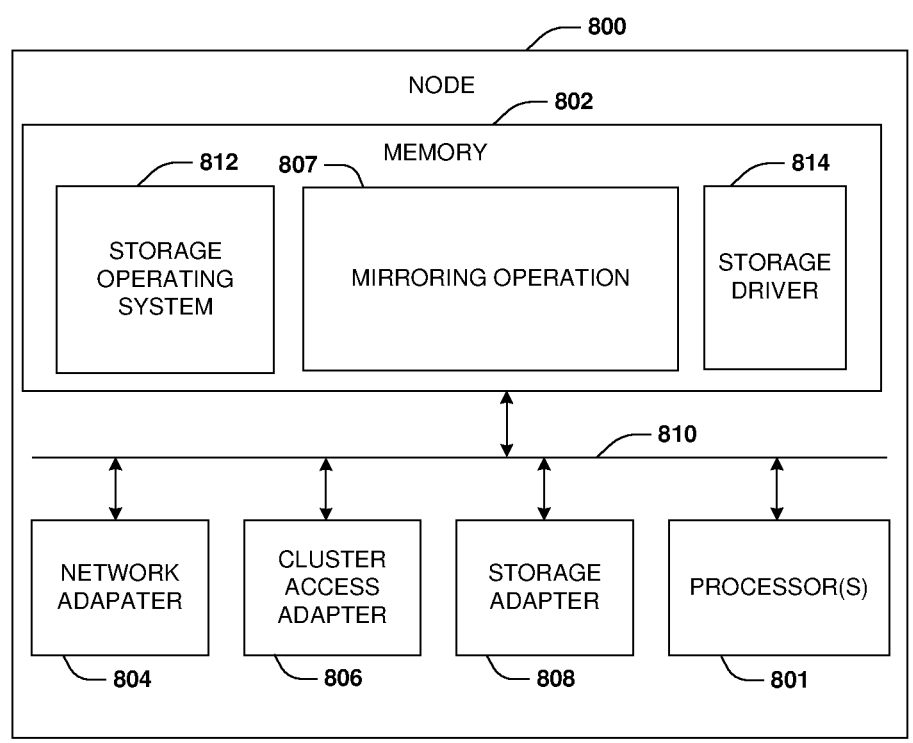
FIG. 8 is a block diagram illustrating an example of a node in accordance with an embodiment of the present technology.

FIG. 8 is a block diagram illustrating an example of a node in accordance with various embodiments of the present technology.

Referring to FIG. 8, a node 800 in this particular example includes processor(s) 801, a memory 802, a network adapter 804, a cluster access adapter 806, and a storage adapter 808 interconnected by a system bus 810. In other examples, the node 800 comprises a virtual machine, such as a virtual storage machine.

The node 800 also includes a storage operating system 812 installed in the memory 802 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 804 in this example includes the mechanical, electrical and signaling circuitry needed to connect the node 800 to one or more of the client devices over network connections, which may comprise, among other things, a point-to-point connection or a shared medium, such as a local area network. In some examples, the network adapter 804 further communicates (e.g., using TCP/IP) via a cluster fabric and/or another network (e.g., a WAN) (not shown) with storage devices of a distributed storage system to process storage operations associated with data stored thereon.

The storage adapter 808 cooperates with the storage operating system 812 executing on the node 800 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 808 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 808 and, if necessary, processed by the processor(s) 801 (or the storage adapter 808 itself) prior to being forwarded over the system bus 810 to the network adapter 804 (and/or the cluster access adapter 806 if sending to another node computing device in the cluster) where the information is formatted into a data packet and returned to a requesting one of the client devices and/or sent to another node computing device attached via a cluster fabric. In some examples, a storage driver 814 in the memory 802 interfaces with the storage adapter to facilitate interactions with the data storage devices.

The storage operating system 812 can also manage communications for the node 800 among other devices that may be in a clustered network, such as attached to the cluster fabric. Thus, the node 800 can respond to client device requests to manage data on one of the data storage devices or storage devices of the distributed storage system in accordance with the client device requests.

A file system module of the storage operating system 812 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 800, memory 802 can include storage locations that are addressable by the processor(s) 801 and adapters 804, 806, and 808 for storing related software application code and data structures. The processor(s) 801 and adapters 804, 806, and 808 may, for example, include processing elements and/or logic circuitry configured to execute the software code and manipulate the data structures.

The storage operating system 812, portions of which are typically resident in the memory 802 and executed by the processor(s) 801, invokes storage operations in support of a file service implemented by the node 800. Other processing and memory mechanisms, including various computer readable media, may be used for storing and/or executing application instructions pertaining to the techniques described and illustrated herein. For example, the storage operating system 812 can also utilize one or more control files (not shown) to aid in the provisioning of virtual machines.

In some embodiments, instructions for performing a mirroring operation 807 may be stored within the memory 802 of the node 800 and executed by the processor(s) 801 to mirror objects between different object stores.

The examples of the technology described and illustrated herein may be embodied as one or more non-transitory computer or machine readable media, such as the memory 802, having machine or processor-executable instructions stored thereon for one or more aspects of the present technology, which when executed by processor(s), such as processor(s) 801, cause the processor(s) to carry out the steps necessary to implement the methods of this technology, as described and illustrated with the examples herein. In some examples, the executable instructions are configured to perform one or more steps of a method described and illustrated later.

Figure 9:
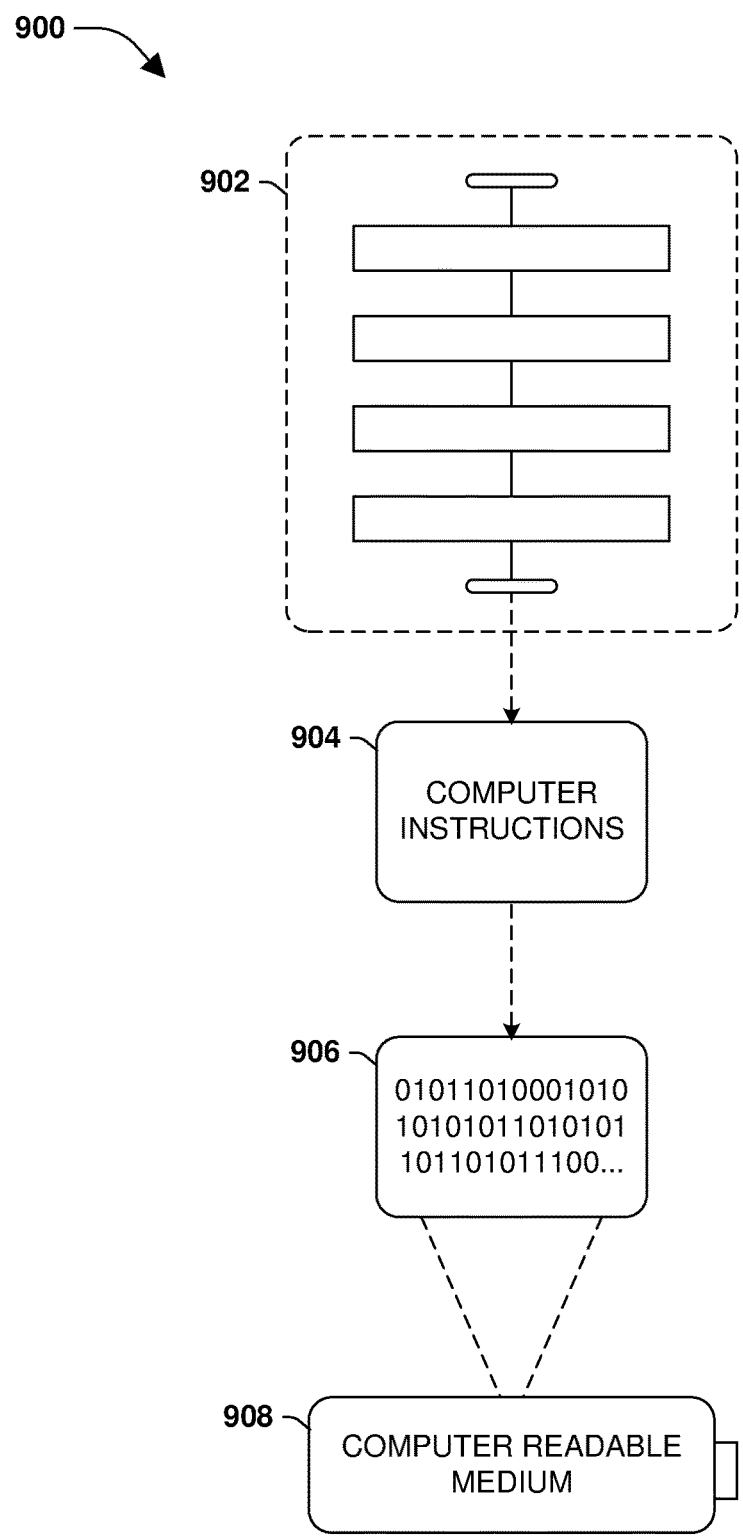
FIG. 9 is an example of a computer readable medium in which an embodiment of the present technology may be implemented.

Still another embodiment involves a computer-readable medium 900 comprising processor-executable instructions configured to implement one or more of the techniques presented herein. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the exemplary method 100 of FIG. 1 and/or at least some of the exemplary method 200 of FIG. 2, for example. In some embodiments, the processor-executable computer instructions 904 are configured to implement a system for implementing a unified object format such as at least some of the exemplary system 300 of FIGS. 3A-3B, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed:

1. A method comprising:
   storing, within a first object store of a first cloud provider that supports a first data layout requirement, an object according to a unified object format where data is stored within a first plurality of slots of a first data section of the object in a compressed format according to non-fixed offsets and boundaries and where slot header metadata is attached to the object; and
   executing a mirroring operation to mirror the object from the first object store of the first cloud provider to a second object store of a second cloud provider that supports a second data layout requirement different than the first data layout requirement supported by the first cloud provider, wherein the mirroring operation packages the object in the unified object format where the object stores the data according to the non-fixed offsets and boundaries satisfying the first data layout requirement of the first cloud provider, to a mirrored object in a fixed offset format where the mirrored object stores the data in an uncompressed format at fixed offsets and boundaries satisfying the second data layout requirement of the second cloud provider, wherein the second data layout requirement is different than the first data layout requirement of the first cloud provider, wherein the executing mirroring operation includes:
      retrieving the object, stored in the unified object format according to the first data layout requirement, from the first object store of the first cloud provider;
      utilizing the slot header metadata to decompress the data from the first plurality of slots to obtain the data in the uncompressed format;

packaging the data from being in the uncompressed format into the fixed offset format according to the second data layout requirement of the second cloud provider to create the mirrored object where the data is stored at the fixed offsets and boundaries within a second plurality of slots of a data portion of the mirrored object; and storing the mirrored object within the second object store of the second cloud provider according to the fixed offset format satisfying the second data layout requirement of the second cloud provider.

2. The method of claim 1, wherein the slot header metadata comprises:
a first metadata portion comprising a compression group number of a slot within which a block of the data is stored and a compression group logical index in the compression group number at which the slot is located.

3. The method of claim 1, wherein the slot header metadata comprises:
a second metadata portion comprising offset and length location information for the data within the first data section.

4. The method of claim 1, wherein the second data layout requirement specifies that uncompressed data is to be packaged into objects at defined offsets and boundaries according to the fixed offset format.

5. The method of claim 1, wherein the first data layout requirement specifies that compressed data is to be packaged into variable sized objects.

6. The method of claim 1, wherein the first data layout requirement specifies that:
for each slot of the object, compression group information is stored according to a tuple that includes a compression group number of the compression group, a compression group read offset as a read offset of the compression group, and a compression group read length as a length of the compression group to read.

7. The method of claim 1, comprising:
performing additional compression upon the data to create additionally compressed data stored within the object in the first object store; and
populating the slot header metadata with compression group information used to preserve the additional compression, wherein the additionally compressed data stored within the object retains the compression.

8. The method of claim 1, comprising:
populating the slot header metadata with compression group information used to preserve compression performed upon the data by a performance tier of a hybrid storage system, wherein the data stored within the object retains the compression.

9. The method of claim 1, comprising:
interpreting, by a cloud backup system, the unified object format, to back up snapshots of a volume hosted at a performance tier as objects formatted according to the unified object format and stored within the first object store.

10. A computing device comprising:
a memory comprising instructions; and
a processor coupled to the memory, the processor configured to execute the instructions to cause the processor to perform operations comprising:
storing, within a first object store of a first cloud provider that supports a first data layout requirement, an object according to a unified object format where data is stored within a first plurality of slots of a first data section of the object in a compressed format according to non-fixed offsets and boundaries and where slot header metadata is attached to the object; and executing a mirroring operation to mirror the object from the first object store of the first cloud provider to a second object store of a second cloud provider that supports a second data layout requirement different than the first data layout requirement supported by the first cloud provider, wherein the mirroring operation packages the object in the unified object format where the object stores the data according to the non-fixed offsets and boundaries satisfying the first data layout requirement of the first cloud provider, to a mirrored object in a fixed offset format where the mirrored object stores the data in an uncompressed format at fixed offsets and boundaries satisfying the second data layout requirement of the second cloud provider, wherein the second data layout requirement is different than the first data layout requirement of the first cloud provider, wherein the executing mirroring operation includes by:
retrieving the object, stored in the unified object format according to the first data layout requirement, from the first object store of the first cloud provider;
utilizing the slot header metadata to decompress the data from the first plurality of slots to obtain the data in the uncompressed format;
packaging the data from being in the uncompressed format into the fixed offset format according to the second data layout requirement of the second cloud provider to create the mirrored object where the data is stored at the fixed offsets and boundaries within a second plurality of slots of a data portion of the mirrored object; and
storing the mirrored object within the second object store of the second cloud provider according to the fixed offset format satisfying the second data layout requirement of the second cloud provider.

11. The computing device of claim 10, wherein the slot header metadata comprises:
a first metadata portion comprising a compression group number of a slot within which a block of the data is stored and a compression group logical index in the compression group number at which the slot is located.

12. The computing device of claim 10, wherein the slot header metadata comprises:
a second metadata portion comprising offset and length location information for the data within the first data section.

13. The computing device of claim 10, wherein the second data layout requirement specifies that uncompressed data is to be packaged into objects at defined offsets and boundaries according to the fixed offset format.

14. The computing device of claim 10, wherein the first data layout requirement specifies that compressed data is to be packaged into variable sized objects.

15. The computing device of claim 10, wherein the first data layout requirement specifies that:
for each slot of the object, compression group information is stored according to a tuple that includes a compression group number of the compression group, a compression group read offset as a read offset of the compression group, and a compression group read length as a length of the compression group to read.

16. A non-transitory machine readable medium comprising instructions for performing a method, which when executed by a machine, causes the machine to:
- storing, within a first object store of a first cloud provider that supports a first data layout requirement, an object according to a unified object format where data is stored within a first plurality of slots of a first data section of the object in a compressed format according to non-fixed offsets and boundaries and where slot header metadata is attached to the object; and
- executing a mirroring operation to mirror the object from the first object store of the first cloud provider to a second object store of a second cloud provider that supports a second data layout requirement different than the first data layout requirement supported by the first cloud provider, wherein the mirroring operation packages the object in the unified object format where the object stores the data according to the non-fixed offsets and boundaries satisfying the first data layout requirement of the first cloud provider, to a mirrored object in a fixed offset format where the mirrored object stores the data in an uncompressed format at fixed offsets and boundaries satisfying the second data layout requirement of the second cloud provider, wherein the second data layout requirement is different than the first data layout requirement of the first cloud provider, wherein the executing mirroring operation includes:
- retrieving the object, stored in the unified object format according to the first data layout requirement, from the first object store of the first cloud provider;
- utilizing the slot header metadata to decompress the data from the first plurality of slots to obtain the data in the uncompressed format;
- packaging the data from being in the uncompressed format into the fixed offset format according to the second data layout requirement of the second cloud provider to create the mirrored object where the data is stored at the fixed offsets and boundaries within a second plurality of slots of a data portion of the mirrored object; and
- storing the mirrored object within the second object store of the second cloud provider according to the fixed offset format satisfying the second data layout requirement of the second cloud provider.

17. The non-transitory machine readable medium of claim 16, wherein the slot header metadata comprises:
- a first metadata portion comprising a compression group number of a slot within which a block of the data is stored and a compression group logical index in the compression group number at which the slot is located.

18. The non-transitory machine readable medium of claim 16, wherein the slot header metadata comprises:
- a second metadata portion comprising offset and length location information for the data within the first data section.

19. The non-transitory machine readable medium of claim 16, wherein the first data layout requirement specifies that:
- for each slot of the object, compression group information is stored according to a tuple that includes a compression group number of the compression group, a compression group read offset as a read offset of the compression group, and a compression group read length as a length of the compression group to read.

20. The non-transitory machine readable medium of claim 16, wherein the first data layout requirement specifies that compressed data is to be packaged into variable sized objects.

* * * * *